United States Patent
Yeung

(10) Patent No.: US 6,949,131 B2
(45) Date of Patent: Sep. 27, 2005

(54) VENTILATOR OR VENTILATING APPARATUS WITH THERMAL EXCHANGER AND AIR FILTER

(76) Inventor: Kui Wong Yeung, Unit 1901, 19/F, Tower A, Hong Kong Worsted Mills Industrial Building, 31-39 Wo Tong Tsui Street, Kwai Chung, New Territories, Hong Kong SAR (CN)

(*) Notice: Subject to any disclaimer, the term of this patent is extended or adjusted under 35 U.S.C. 154(b) by 0 days.

(21) Appl. No.: 10/749,375

(22) Filed: Jan. 2, 2004

(65) Prior Publication Data

US 2004/0139712 A1 Jul. 22, 2004

Related U.S. Application Data

(63) Continuation of application No. 10/046,712, filed on Jan. 17, 2002, now abandoned, which is a continuation-in-part of application No. 09/960,387, filed on Sep. 24, 2001.

(30) Foreign Application Priority Data

Sep. 20, 2001 (HK) .......................................... 01106671 A

(51) Int. Cl.[7] .............................................. B01D 46/00
(52) U.S. Cl. ...................... 55/467.1; 55/385.1; 55/470; 55/471; 55/472; 55/478; 55/481; 55/485; 55/506; 55/524; 96/154; 165/165; 165/166
(58) Field of Search ............................ 55/385.1, 467.1, 55/470, 471, 472, 478, 481, 485, 486, 506, 524; 96/154; 454/207; 165/53, 54, 164, 165, 166

(56) References Cited

U.S. PATENT DOCUMENTS

| | | | | | |
|---|---|---|---|---|---|
| 1,825,498 | A | * | 9/1931 | Wogan | 165/165 |
| 4,377,201 | A | * | 3/1983 | Kruse et al. | 165/54 |
| 4,415,019 | A | * | 11/1983 | Hunzicker | 165/54 |
| 5,285,842 | A | * | 2/1994 | Chagnot | 165/54 |
| 5,761,908 | A | * | 6/1998 | Oas et al. | 165/54 |
| 6,059,023 | A | * | 5/2000 | Kurematsu | 165/165 |
| 6,289,974 | B1 | * | 9/2001 | DeGregoria et al. | 165/54 |
| 2003/0051861 | A1 | * | 3/2003 | Yeung | 165/54 |

* cited by examiner

Primary Examiner—Duane Smith
Assistant Examiner—Jason M. Greene
(74) Attorney, Agent, or Firm—Buchanan Ingersoll PC

(57) ABSTRACT

A compact ventilator with high efficiency thermal exchanger and a conveniently exchangeable air filter. The conveniently exchangeable filter enables a ventilator with thermal exchanger to be easily and regularly maintained and serviced, thereby enhancing its practical utility.

13 Claims, 6 Drawing Sheets

VENTILATOR OR VENTILATING APPARATUS WITH THERMAL EXCHANGER AND AIR FILTER

This disclosure is a continuation of U.S. patent application Ser. No. 10/046,712, filed Jan. 17, 2002 abandoned, which is a continuation-in-part of U.S. patent application Ser. No. 09/960,387, filed on Sep. 24, 2001, and claims the benefit of Hong Kong SAR, China application Ser. No. 01106671,2, filed on Sep. 20, 2001, the contents of which are incorporated herein by reference.

FIELD OF THE INVENTION

The present invention relates to ventilators, ventilating devices, apparatuses, systems and/or installations and, more particularly, to ventilators, ventilating devices, apparatuses, systems and installations including a thermal exchanger and an exchangeable air filter. This invention also relates to air conditioners having a built-in thermal exchanger together with an exchangeable air filter disposed at the upstream end of the fresh air inlet to said thermal exchanger.

BACKGROUND OF THE INVENTION

In this specification, the term "air-conditioners" generally and collectively means air heating, cooling, drying, moistening and other air conditioning devices, apparatuses, systems and installations for succinctness unless the context requires otherwise. Likewise, the term "ventilators" generally and collectively means ventilating or air-circulating means, devices, systems or installations for succinctness, unless the context otherwise requires. Throughout this specification, the term ventilators, ventilating apparatus and air-conditioners may be considered equivalent to the extent appropriate.

Air-conditioners are widely used to provide comfortable indoor conditions for occupants of residential, commercial or public buildings, premises or other enclosed spaces such as offices, schools, cinemas, theatres, halls, and other similar places. However, while many air-conditioners are provided with means to remove stale indoor and introduce fresh out-door air, their performance is not entirely satisfactory. In fact, there have been reports that the indoor carbon-dioxide concentration in many air-conditioned schools exceeds the generally acceptable level of 800 ppm by as much as 35%.

To supplement the performance of air-conditioners, ventilators may be used with or built-in to air-conditioners so that indoor air, which may contain a high concentration harmful gases, can be constantly and regularly replaced with air supply which has a higher oxygen content and a lower harmful gas content. Typical harmful gases found in enclosed buildings, especially crowded buildings, include carbon-dioxide, carbon-monoxide, unpleasant odors, irritants and harmful gases such as formaldehyde in the building materials and the radioactive radon gas released from granite.

On the other hand, although out-door air generally has a higher oxygen content, it is not without pollutants and air-pollution is especially bad in heavily built-up urban or city areas. Typical pollutants found in out-door air include particulate pollutants such as dusts, ashes, smoke particles, particles from incomplete combustion of diesel fuel, pollens, odors, acid or other chemical gases, and bacterial organisms.

In order to block, or at least minimise, the entrance of harmful substances into an enclosed indoor space to provide a healthier indoor environment, ventilators or air-conditioners are usually provided with air filters at the "fresh-air" intake ports. The air filters may be simple mesh filters or more sophisticated filters such as activated carbon filters, polymeric foam filters, glass fiber filters and biostat filters such as those containing potassium permanganate are useful alternatives or additions. In some applications, high-efficiency particulate air (HEPA) filters which are known to be effective to remove up to 99.7% of air-borne particles of the size of 0.3 microns or larger, can be used. Some air filters for use in air-ventilators may include one or more types of filtering materials and designs in order to optimally removed different types of harmful substances from the supply air.

Since the conditioned indoor air to be exhausted usually or, as a norm, contains re-usable thermal energy, it is desirable that such ventilators are provided with thermal exchangers so that reusable thermal energy can be exchanged between the in-coming and the out-going air streams. With this energy recycling process, an additional supply of out-door air into an enclosed indoor space can be provided with less energy costs or wasted energy.

Examples of ventilators with thermal exchangers are described in the following U.S. Patents: U.S. pat. No. 5,238,052, U.S. pat. No. 4,874,042, U.S. pat. No. 4,377,400. In those examples, thermal exchangers are utilized to recover thermal energy from the out-going air stream to reduce wasted thermal energy discharged from the exhaust air. This recouperation of energy is beneficial for the protection of the environment, as well as imposing a lesser load or demand on the air-conditioners and, at the same time, reducing the operating and running costs of air-conditioners. Such benefits are achievable because it is known that thermal exchange between a cold air stream and a hot air stream will reduce the total energy requirement for conditioning the in-coming air stream. Thus, for an air-cooling system, the in-coming air stream is cooled by the out-going or exhaust chilled air before the exhaust air leaves the air-conditioner. Similarly, for an air-heating system, the out-going warm air is used to warm up the in-coming out-door air before it enters a building.

It is therefore desirable to provide ventilators with high efficiency air filters which operate with high thermal efficiency and low running costs so that the environment can be protected, wasted heat as well as energy costs can be reduced. As space is usually precious in city areas, it is also desirable that the improved ventilators are simple and compact. Preferably, important parts or components, such as the thermal exchanger unit, of the air-ventilators are of modular design for easy maintenance. In addition, while the air-ventilator can be used as a stand-alone unit, it is desirable that the improved air-ventilators can be incorporated or used in or with air-conditioners.

In light of the afore-mentioned requirements for contemporary air-conditioners, it is highly beneficial and desirable that air-conditioners incorporating thermal exchangers as well as highly efficient air filters with high durability and reliability are provided. However, it has been observed that the performance of conventional air-conditioners of this description degrades after an extended period of use. Hence, it is highly desirable that air-conditioners or ventilators with highly efficient thermal exchangers and air filters which can provide a stable performance over a period of extend use can be provided. At least, such ventilators should have a design which can be easily or conveniently maintained for consistent performance.

OBJECT OF THE INVENTION

Accordingly, it is an object of the present invention to provide improved ventilators with thermal exchangers and highly efficient air filters, preferably, such ventilators are simple, compact and reliable. It is another object of the present invention to provide improved ventilators with thermal exchangers which overcome, or at least alleviate, the shortcomings associated with such known ventilators. Preferably, the ventilators are of modular design for easy maintenance. As a minimum, it is an object of the present invention to provide the public with a choice of ventilators or air-conditioners incorporating thermal exchangers and filters which are compact, durable and reliable.

SUMMARY OF THE INVENTION

According to the present invention, there is provided a ventilating apparatus including a main housing, a thermal exchanger, a first and a second air-moving devices and a removable air-filter, said main housing includes a front housing, a rear housing, a first and a second air compartments, and a filter compartment, said thermal exchanger and said air-moving devices are disposed within said main housing and between said front and rear housings, said thermal exchanger includes an intake section and an exhaust section, said front housing includes at least an aperture connecting to the downstream end or outlet of said intake section of said thermal exchanger.

said first and second air-moving devices are respectively for moving air through said intake and exhaust sections of said thermal exchanger, said first air compartment connects said intake section of said thermal exchanger, said first air-moving device and said filter compartment such that said filter compartment is disposed upstream of said intake section of said thermal exchanger for removably receiving said air filter, said second air compartment connects said exhaust section of said thermal exchanger and said second air-moving device, a section of said first air compartment upstream of said intake section of said thermal exchanger, being that section of said first air compartment containing said filter compartment, is adjacent to and accessible or communicable through said front housing.

According to another aspect of this invention, there is provided a ventilating apparatus for transferring air between a confined space and an external space according to any of the preceding claims, wherein said first aid compartment provides a path for moving air from said external space into said confined space, said second air compartment provides a path for moving air from said external space to said confined space, wherein, when installed for operation, said main housing bridges between said external space and said confined space such that said front housing and said rear housing are present respectively in said confined space and said external space, said aperture on said front housing downstream of such intake section provides an inlet interface for air to move from said external space to said confined space.

According to a further aspect of this invention, there is provided a ventilating apparatus for transferring air between a first space and an second space including a main housing, a thermal exchanger, a first and a second air-moving devices and a removable air-filter, said main housing includes a front housing, a rear housing, a first and a second air compartments, and a filter compartment, said thermal exchanger and said air-moving devices are disposed within said main housing and between said front and rear housings, said thermal exchanger includes an intake section and an exhaust section, said front housing includes apertures connecting to the downstream end or outlet of said intake section of said thermal exchanger.

said first and second air-moving devices are respectively for moving air through said intake and exhaust sections of said thermal exchanger, said first air compartment connects said intake section of said thermal exchanger, said first air-moving device and said filter compartment such that said filter compartment is disposed upstream of said intake section of said thermal exchanger for removably receiving said air filter, said second air compartment connects said exhaust section of said thermal exchanger and said second air-moving device.

at least a section of said first air compartment upstream of said intake section of said thermal exchanger, being that section of said first air compartment containing said filter compartment, is adjacent to and accessible through said front housing, and said front housing includes an aperture through which said air filter can be inserted into or removed from said filter compartment, wherein, when installed for operation, said main housing separates said first and said second spaces so that said front housing and said rear housing are respectively present in said first and said second spaces and apertures on said front housing downstream of such intake section of said thermal exchanger provide an inlet interface for air to move from said first space to said second space.

Preferably, said front housing includes an aperture through which said air filter can be inserted into or removed from said filter compartment.

Preferably, said filter compartment generally extends between said front and rear housings.

In one specific embodiment, said main housing includes a longer side extending in a general lengthwise direction and including said front and rear housings and a shorter side generally extending from said front housing towards said rear housing, at least an aperture providing an upstream path to said filter compartment is provided on said shorter side. Preferably, said filtering plane of said filter generally forms an angle with said front housing. Preferable that angle being about 90°. Furthermore, said first housing may include at least an aperture connecting to the upstream end of said exhaust section of said thermal exchanger. Preferably, said front housing also includes a detachable member on which said apertures for connecting to said thermal exchanger and said filter compartment are formed.

In one example, said first air-moving device is disposed intermediate between said air-filter and the upstream end of said intake section of said thermal exchanger.

For example, said first air-moving device may include a rotary fan having an axis which is generally perpendicular to said air-filter.

Preferably, said air-filter includes a combination of activated carbon and HEPA filters.

Preferably, both said first and second air-moving devices are disposed upstream of said intake and exhaust sections of said thermal exchanger.

For example, said thermal exchanger includes a plurality of stacked metal sheets configured to form a plurality of air-passageways, wherein air-passageways formed on the two sides of said sheet are alternatively connected to said intake and exhaust sections of said thermal exchanger.

In the preferred embodiment, the combination of said first and second air moving devices are disposed intermediate between said filter compartment and said thermal exchanger.

BRIEF DESCRIPTION OF THE DRAWINGS

Preferred embodiments of the present invention will now be explained by way of example and with reference to the accompanying drawings, in which.

DETAILED DESCRIPTION OF THE PREFERRED EMBODIMENTS

Figure 1:
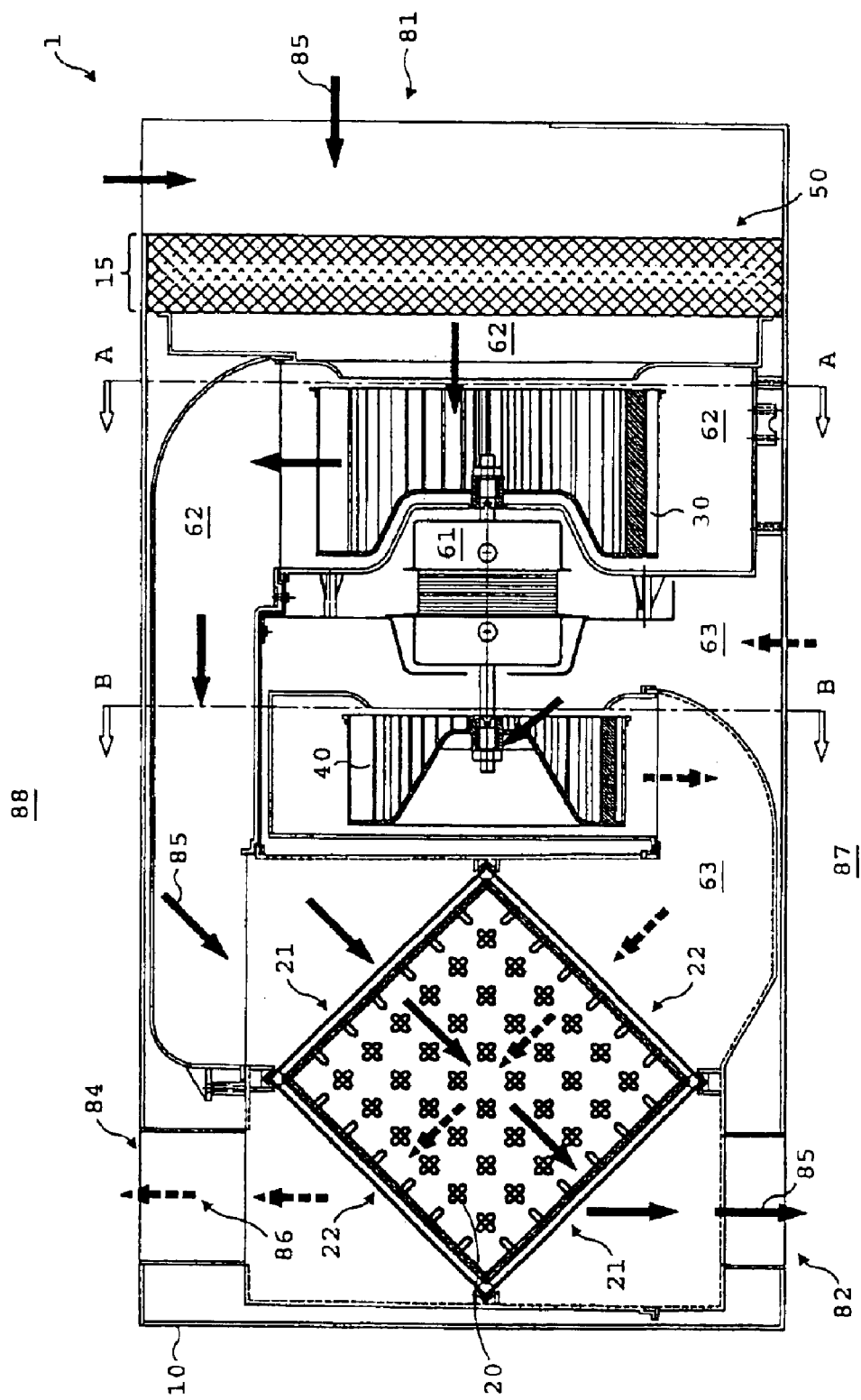
FIG. 1 is an illustrative diagram showing the top view of a first preferred embodiment of a ventilator of the present invention with the top part of the main housing removed for showing the arrangement of the various example parts and components with arrows indicating the directions of air flow.

Referring to FIGS. 1 to 5, there is illustrated a first preferred embodiment of a ventilator of the present invention. In the Figures, arrows indicating the directions of air flow within the air-ventilator are provided to assist understanding only.

The ventilator or ventilating generally apparatus (1) includes a main housing (10), a thermal exchanger (20), a first air moving device (30), a second air moving device (40) and an air filter (50).

Figure 5:
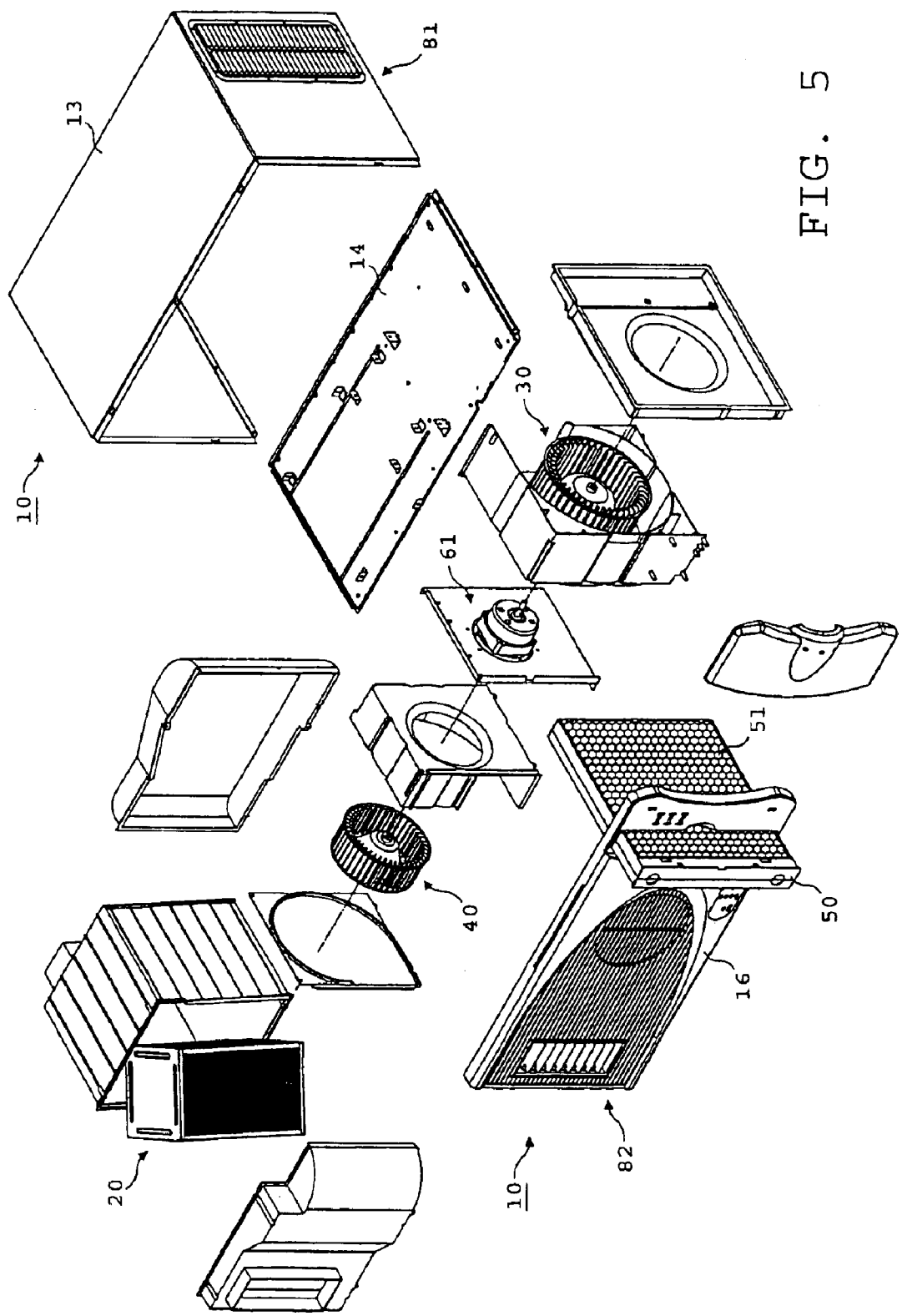
FIG. 5 shows the dis-assembled form of the ventilator of FIG. 1.

The main housing (10) provides general support and shielding to the major components as well as providing defined air channels for the air moving in and out of a confined space through the ventilator. The main housing (10) does not need to be of any specific shape or configuration and the example shown in FIG. 5 is merely provided for illustration only. In general, the main housing (10) can be said to include a front portion (11), a rear portion (12), a top portion (13), a bottom portion (14) and a filter compartment (15).

The bottom portion (14) generally includes a rigid structure to support the weight of the operating components. The top portion (13) generally includes a cover and provides weather shielding to the essential parts and components.

The front portion (11) provides a main interface between the indoor space (87) and the outside (88) as well as gateways for external air to enter and indoor air to leave the indoor (87) space. These gateways are, for example, formed by way of grated apertures located corresponding to the downstream and upstream ends and respectively of the intake and exhaust sections of the thermal exchanger. For ease of maintenance, the front portion (11) may include a detachable cover (16) with grated apertures so that it can be removed for cleaning the accessible parts periodically.

The rear portion (12) of the main housing (10) generally refers to the part of the main housing which is furthest away or opposing the front portion. The rear portion may provide outlet apertures for the downstream end of the exhaust section of the thermal exchanger. In general, the exhaust outlet should be disposed furthest away from the upstream "fresh air" inlet of the intake section for better intake air quality.

Figure 2:
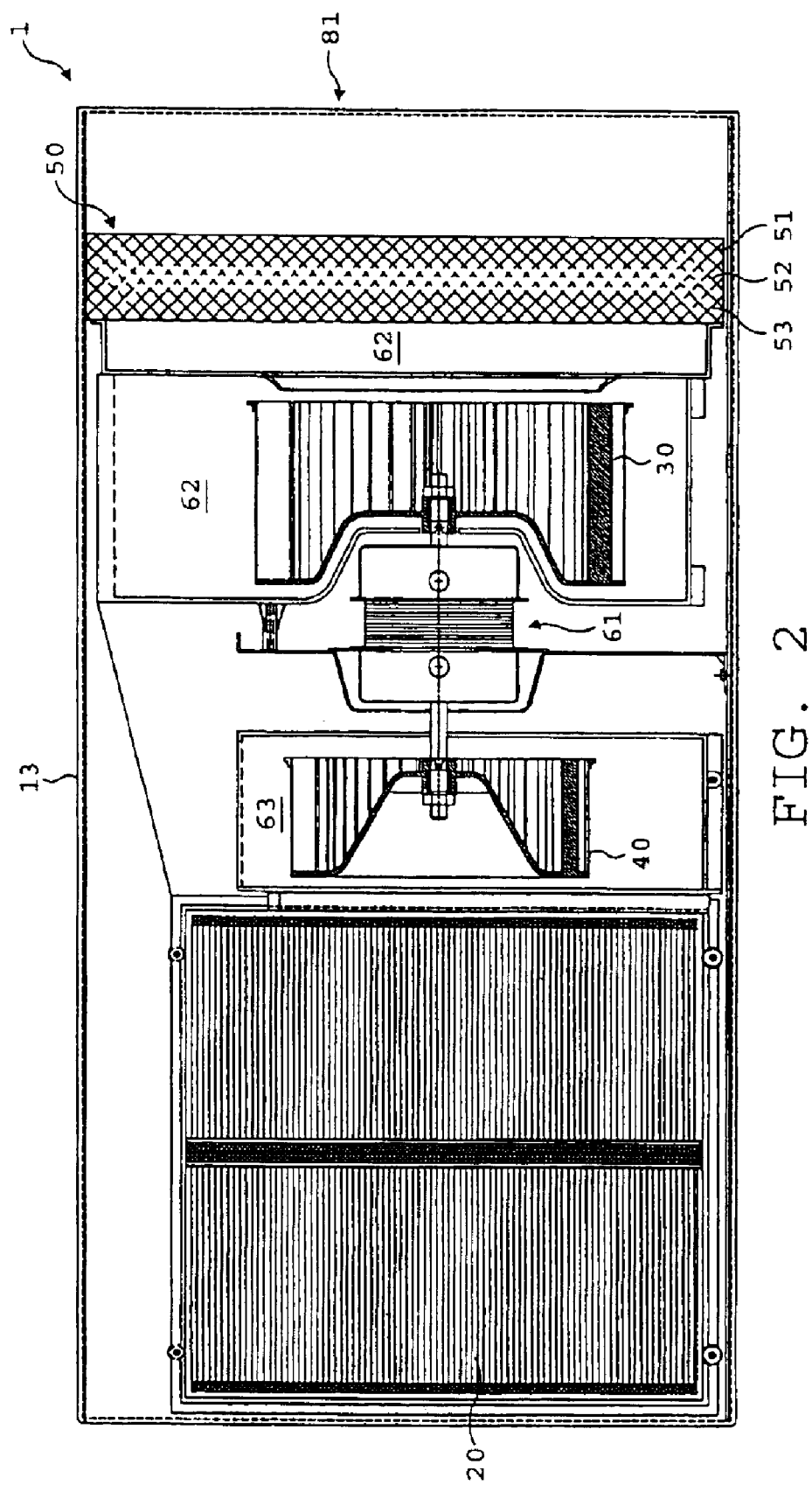
FIG. 2 illustrates the front exposed view of the ventilator of FIG. 1.
Figure 4:
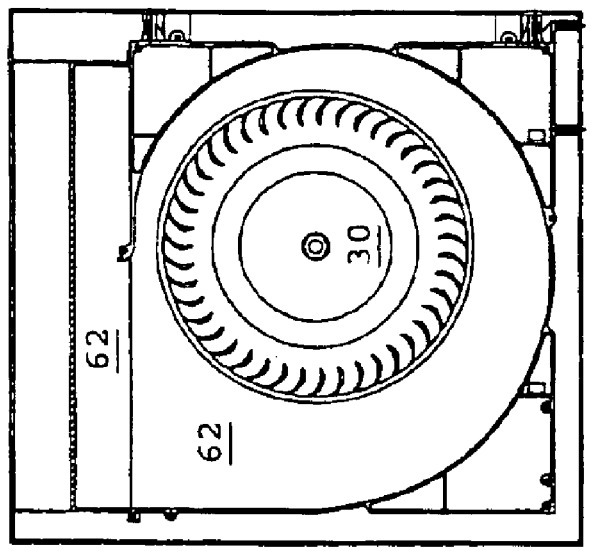
FIG. 4 illustrates the ventilator when viewed from the line B—B.
Figure 3:
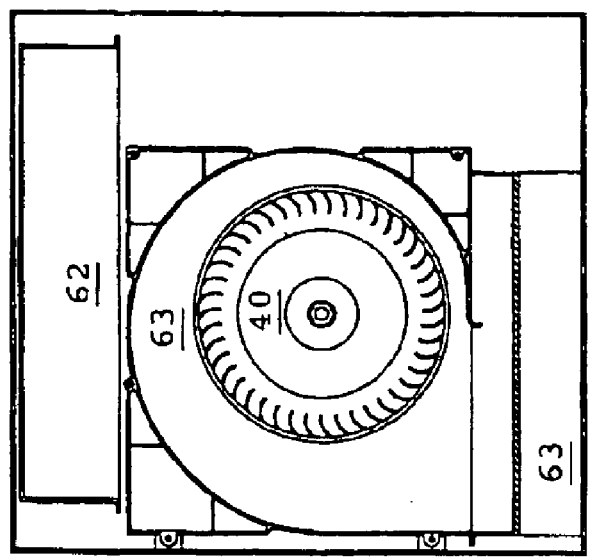
FIG. 3 illustrates the ventilator when viewed from the line A—A.

Referring more particularly to FIGS. 1, 2 and 5, the thermal exchanger (20), the air-moving devices (30, 40), the filter compartment (15) and the re-moveable filter are all disposed within the main housing (10) and between the front and rear housings.

Inside the main housing (10), there are provided a first (62) and a second (63) enclosed compartments or chambers. The first compartment provide a "fresh air" path (illustrated by solid arrows) for outside air to enter the enclosed indoor space through the air-ventilator. The second compartment or air-passageway (illustrated by broken arrows) provides an exit path ("exhaust air path") for indoor air to leave the enclosed space through the air-ventilator.

More specifically, the intake section of the thermal exchanger is connected to the first air moving device (30) (for drawing outside air), the filter compartment (15), the air-filter (50) and the fresh (outdoor) air inlet apertures (81) by the first air compartment (62). The second air moving device (40) (for drawing exhaust air), the exhaust section of the thermal exchanger are connected by the second compartment (63) or air-passageway. To prevent clogging of the thermal exchanger due to adverse substance in the exhaust air, a filter may be inserted at the upstream end of the second compartment (63) which is conveniently located on the front housing (11).

The thermal exchanger (20) provides means for thermal energy exchange between the in-coming (85) and the out-going (86) air streams so that the total energy requirement for conditioning the air streams coming into the indoor space can be reduced.

The thermal exchanger (20) generally includes an intake section (21) for the in-coming air (85) and an exhaust section (22) for the out-going air (86). The intake (21) and exhaust sections (22) are brought into close proximity for thermal contact and to bring about thermal exchange between the two streams. However, the air streams in both sections remain separated or un-mixed during the thermal exchanging process. The intake section provides transit thermal exchanging paths for external air to enter the indoor or confined conditioned space. Likewise, the exhaust section provides transit paths for air to leave that indoor or confined space.

Many types of thermal exchangers are known. For example, the plate-type, the corrugated board type, the fin and tube-type and shell and tube-type heat exchangers. Plate-type heat exchangers are generally less complicated and more easily made and are therefore used in the present preferred embodiment for illustration purpose. Of course, other suitable types of heat exchangers can be used with suitable modifications and adaptations.

Figure 6:
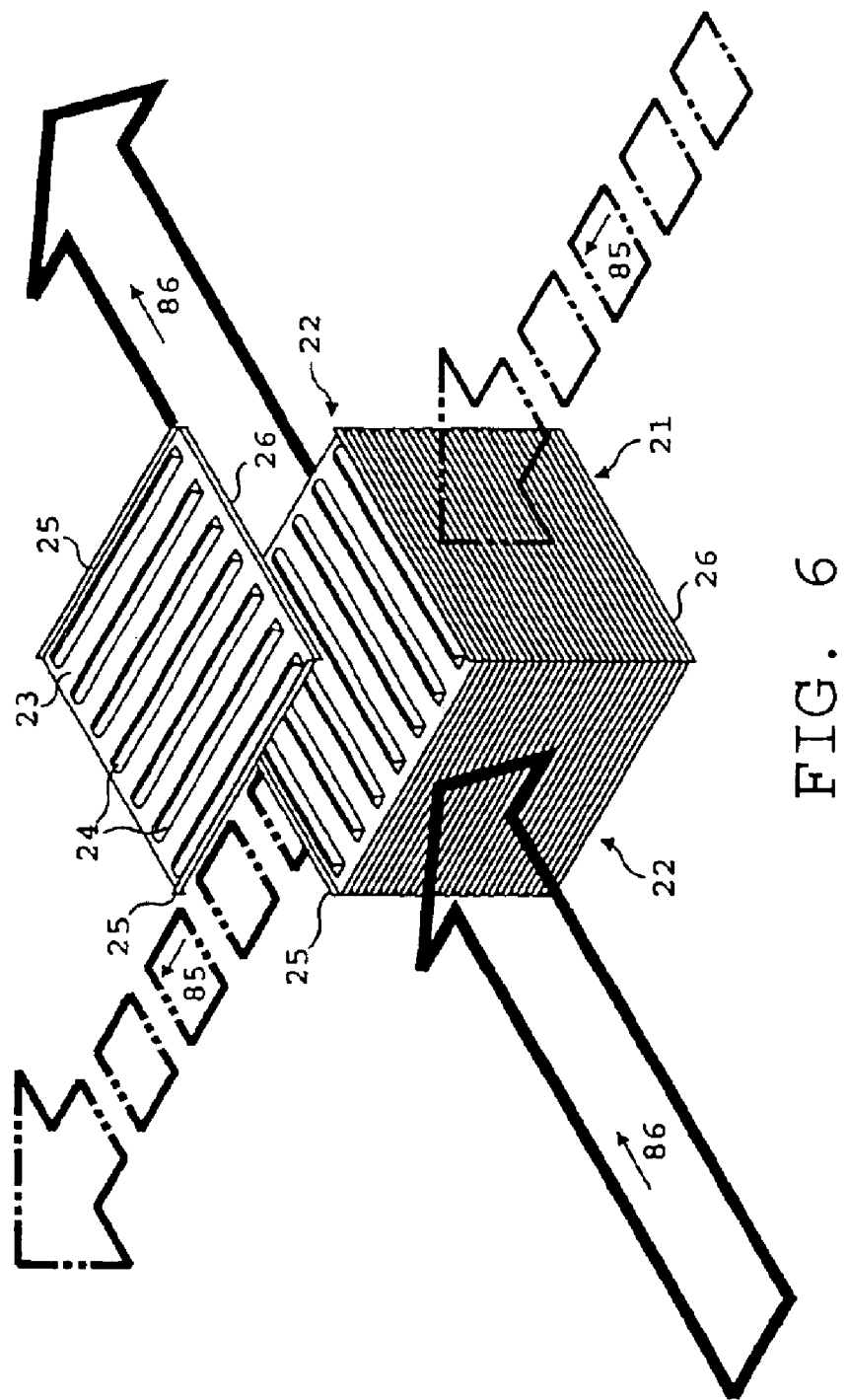
FIG. 6 illustrates a preferred example of a thermal exchanger suitable for present invention made of stacking aluminium foils with arrows illustrating the air-flow paths.

In FIG. 6, there is shown a preferred example of a thermal exchanger (20) which can be used in the present preferred embodiment. The thermal exchanger (20) unit includes an assembly of parallelly stacked thermal exchanger elements (23) which are generally thin metallic sheets, plates or foils, such as aluminium sheets or foils. Thin metallic sheets or foils are preferred because their high thermal conductivity offers high thermal transfer rate and their small thickness offers high thermal sensitivity. These characteristics together offer a high thermal efficiency.

The thermal exchanging sheet elements are formed with a plurality of additional spacers (24) which are parallelly distributed along the width of the element. The spacers are preferably ribs with a correspond groove on the other side. The ribs (24) can be pressed to shape, since thin metallic sheets, especially sheets made of aluminium or aluminium alloys, are substantially semi-rigid. The spacers generally provide additional contact surface area for thermal contact within a sub-channel of a given volume to enhance thermal exchanger efficiency. At the same time, spacers also serve as additional flow guides or regulators within the same sub-channel.

The thermal exchanging sheets are preferably square, rhombic or even rectangular with the two pairs of opposite sides of the sheets oppositely bent so that one pair is bent upwards and the other pair bent downwards.

The thermal exchanger sheets are stacked so that the downwardly extending edges (26) of one sheet are aligned with the upwardly extending edges (25) of the adjacent sheet element.

By sealing and joining the aligned downwardly and upwardly extending walls of adjacent sheets, a confined sub-channel having an air-inlet and an air-out on the opposite sides of the metallic sheet is formed. The sealed sides then define the lateral boundary of the confined sub-channel. By stacking the metallic sheets in an alternate manner so that the upstanding walls (25) (or alternatively, the downwardly extending walls) on adjacent thermal exchanging sheet members are substantially orthogonal to each other, alternate sub-channels having substantially orthogonal orientations are formed.

The orthogonal sub-channels of the thermal exchanger provide alternate passageways for the in-coming (85) and out-going air streams (86) so that they can have thermal interaction without mixing. The multi-layer stacking structure enables the main air-stream to be split into a plurality of sub-streams to increase the effective contact area, thereby increasing the total thermal contact area and hence the thermal transfer efficiency.

Because thin and light metallic sheets are used to assemble the thermal exchanger, the thermal exchanger is generally light and has a simple structure which can be made and replaced at low costs and relatively easily. The entire thermal exchanger unit (20) is preferably made as a removable module so that it can be removed for regular servicing or replacement to maintain a high thermal exchange efficiency. For example, the thermal exchanger unit can be assembled within a frame or a cage so that the whole unit can be removed or replaced easily.

In order to cause air streams to move through intake and exhaust sections of the thermal exchanger so that fresh air is supplied into and stale air removed from the indoor space, air-moving devices are provided. In general, rotary vane wheels, centrifugal fans, blowers, propellers are the commonly used air-moving devices although others can also be used.

In the present preferred embodiment, the air-moving device for the fresh air path (the "first air-moving device") includes a rotary vane wheel or a centrifugal fan placed in the first air-passageway intermediate between the air-filter and the thermal exchanger.

The air-moving device for removing indoor air to the outside (the "second air-moving device") includes a similar rotary vane wheel or centrifugal fan placed between the thermal exchanger and the indoor air intake port.

As shown in the Figures, centrifugal fans are used as air-moving devices to cause air movement along the two enclosed air-compartments as well as drawing air from the outside through the filter. However, it should be noted that other comparable air-moving devices, for example, propeller, centrifugal fans and rotary vane wheels can also be used.

In the present embodiment, the first (30) and the second (40) air-moving devices are connected to a common electric motor (61) so that both air-moving devices are driven by the same motor for a simple and compact construction as well as minimising component costs.

In order to mitigate, prevent or slow down the building up of adverse substances in a thermal exchanger, a filter must be provided before the external air enters the thermal exchanger. To protect the intake section of the thermal exchanger, an air filter (50) can be placed at an upstream position before fresh air enters the intake section. For example, the air filter may be placed in the first compartment (62) and at the fresh air-inlet to the first air moving device. Alternatively, or in combination, an air filter may be placed between the first air-moving device (30) and the thermal exchanger (20). The same arrangement may be applied to the exhaust section with suitable and appropriate modification.

To enhance in-coming air quality an example of a preferred air filter includes a multi-layer filter element which comprises a first layer (51) of mesh or grid filter, a second layer (52) of an activated carbon filter and a third layer (53) of HEPA filter. The first filter layer (51) is for filtering larger particulate pollutants. The second layer (52) of activated carbon provides means to absorb odors and can also include other chemical absorptive agents or biostats such as potassium permanganate. The third layer (53) includes a high-efficiency particulate air (HEPA) filter which is known to be able to remove 99.7% of particulate pollutants of the size of 0.3 microns or larger from air. Of course, "absolute" filters or other chemical-absorptive filters can also be used in combination, in addition, or in replacement to the filter elements, especially in addition to the activated carbon.

To allow easy cleaning, maintenance and replacement of the individual constituting filter elements, it is preferred that the filter is in modular form and includes modular filter elements. A modular design enables filters having different operating life to be cleaned and/or replaced at different time intervals to attain optimal air filtering. Of course, other modular filters including any suitable filtering elements may be used without loss of generality.

In general, typical ventilators with thermal exchangers are generally wall mounted through a window opening with the front portion inside the confined indoor space and rear portion outside. For aesthetic considerations and for all practical applications, the portion of the ventilator protruding from or overhanging the window opening must be minimal. As a result, fresh air filters for conventional ventilators are always disposed at the rear portion of the main housing in a filter compartment which is usually located outside and therefore not conveniently accessible.

In such conventional ventilators, the filters are usually disposed so that the filter plane is generally parallel to the front housing which usually includes a detachable cover with apertures for fresh air supply and stale air removal.

However, since the filters are mounted outdoors it is extremely difficult and inconvenient to access such air filters for maintenance or cleaning, especially where the ventilators are mounted in high-rise buildings. This at least partly explains why ventilators of this type are not yet widely used.

In order to enable the air filter to be conveniently accessible for maintenance or replacement, there is provided in the present invention an improved configuration. In particular, a filter accessing aperture is provided on the front portion of the main housing or the removable cover. By, for example, arranging an air filter (50) that its filtering plane is generally perpendicular to the plane of the front portion of the main housing, as contrast to the conventional filter plane which is substantially parallel to the plane of the front cover, a long existing problem for providing a removable filter for such ventilators has been alleviated.

In the present invention, the ventilator is configured so that that fresh air inlet (82) is disposed on one side of the top housing (13). A detachable air filter (50) is inserted adjacent to the fresh air inlet so that air is filtered before entering the thermal exchanger. To accommodate such an air filter, a filter compartment (15) is provided within the main housing (10). It will be noted that, the filter compartment (10) generally extends between the front portion of the main housing and the rear portion.

It will be observed that at least a section of the first air compartment (62) which is upstream of the intake section of the thermal exchanger (20) is disposed adjacent to or juxtaposes the front housing. That section corresponds to the filter compartment and is provided with an aperture accessible through the front housing (11) so that a removable filter can be inserted or removed through the front housing.

Figure 7:
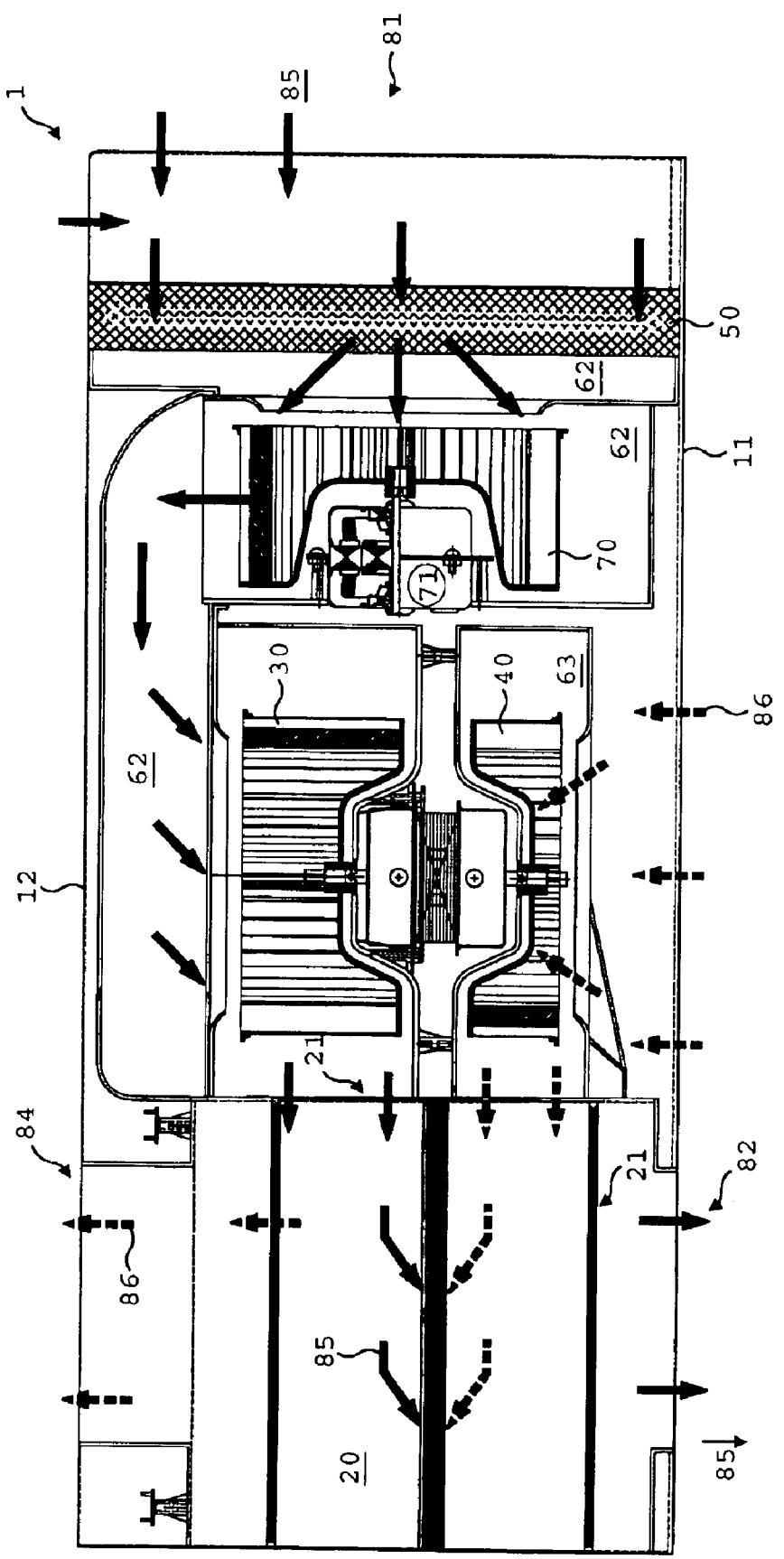
FIG. 7 shows a second preferred example of a ventilator having a thermal exchanger.

In a second preferred embodiment of the present invention, as shown in FIG. 7, and with the same set of numeral reference, the ventilator includes an additional air-moving device (70) which is placed in the first air compartment (62) or the fresh air-passageway to compensate for possible imbalances which may result from under-pressure as a result of filter clogging (50). Filter clogging may result in difficulty in drawing outside air into the enclosed space via the air-ventilator. This additional air-moving device may be a centrifugal fan connected to a second electric motor (71) which provides additional suction to draw air from the outside through the air-filter. The drawn fresh air is then delivered towards the first air-moving device for continual delivery to the thermal exchanger. As this arrangement mitigates the under-pressure problem, performance of the ventilator can be maintained without the need for a high speed or high power suction device to compensate for the increased loading due to a clogged or partly clogged filter. As a result, both the first and the additional air-moving devices can operate within the preferred normal rotational speed range of 800–1,200 rpm and, at the same time, maintain a high thermal efficiency.

For a more sophisticated air-ventilator, the additional air-moving device can be micro-processor controlled with sensors monitoring the imbalance in order to provide optimal operation of the additional air-moving device in co-ordination with the other air-moving devices.

While a preferred example of a ventilator with thermal exchanger and a removable filter or filter module has been described in the present embodiment to assist understanding, it would be appreciated that other suitable arrangements or configurations of ventilators can also be utilised to realise the present invention. For example, while the present example has been explained by reference to a main housing having a generally rectangular shape, it would be obvious to persons skilled in the art that different shapes, for example, trapezoidal, polygonal, can be used while achieving substantially the same result.

More particularly, it is a general characteristic of the present invention that an air-filter disposed upstream of the intake section of a thermal exchanger can be removed from a position near the fresh air outlet of the ventilator. It is a specific characteristic that the main housing has a longer side with a general longitudinal direction and a shorter direction and the plane of the air filter generally forms an angle, preferably about 90°, with the long direction.

Furthermore, although the present invention has been described by reference to a stand alone air-ventilator, the present invention can also be incorporated in an air-conditioner to improve thermal efficiency. For example, the fresh air can, after thermal exchange, be passed on to the cooling or heating unit for further conditioning.

While the present invention has been explained with reference to preferred embodiments described above, it would be appreciated by persons skilled in the art that trivial modifications and variations can be made to realise the concept disclosed in the present invention without departing from the scope and spirit of the present invention.

What is claimed is:

1. A ventilating apparatus comprising a main housing, a thermal exchanger, a first air-moving device, a second air-moving device, and a removable air-filter, said main housing comprising a front housing portion, a rear housing portion, a first air compartment, a second air compartment and a filter compartment, said thermal exchanger being of a cross-flow type and comprising an intake section and an exhaust section, wherein thermal energy can exchange between air in said intake section and air in said exhaust section without mixing, said first and second air compartments forming separate enclosed air channels which cross at said thermal exchanger without mixing, said first air-compartment being in communication with said intake section of said thermal exchanger and said second air-compartment being in communication with said exhaust section of said thermal exchanger, the downstream end of said first air compartment being in communication with said front housing portion and the upstream end of said second air compartment begins at said front housing portion, said first and said second air-moving devices being respectively for moving air along said first and said second air compartments, said first and said second air-moving devices being driven by a common motor axle, said second air-moving device being intermediate said first air-moving device and said thermal exchanger, the combination of said thermal exchanger and said first and second air-moving devices being intermediate said front and rear housing portions, said first air-moving device and said intake section of said thermal exchanger is interconnected by a portion of said first air compartment, wherein the portion of said first air compartment interconnecting said first air-moving device and said intake section of said thermal exchanger being intermediate said second-air moving device and said rear housing portion, wherein, said removable air-filter is at the upstream end of said first air-moving device and is removable from said front housing portion.

2. A ventilating apparatus according to claim 1, wherein said apparatus is adapted to transfer air between a confined space and an external space, and wherein said first air compartment provides a path for moving air from said external space into said confined space, said second air compartment provides a path for moving air from said confined space to said external space, wherein, when installed for operation, said main housing bridges between said external space and said confined space such that said front housing portion and said rear housing portion are present respectively in said confined space and said external space.

3. A ventilating apparatus according to claim 1, wherein said second air-moving device is intermediate said first air compartment and said second air compartment.

4. A ventilating apparatus according to claim 1, wherein the combination of said first air compartment and said first air-moving device is adapted for moving air towards said rear housing portion upon initial exit of air from said first air moving device, said second air-moving device is adapted for moving air towards said front housing portion upon initial exit of air from said second air moving device, and the portion of said second air compartment interconnecting said second air-moving device and said thermal exchanger directs air exiting from said second air moving device towards said rear housing portion.

5. A ventilating apparatus according to claim 1, wherein said common axle of said first and second air-moving devices extends between said air-filter and said thermal exchanger.

6. A ventilating apparatus according to claim 1, further comprising an additional air-moving device, said additional air-moving device being disposed inside said first air compartment and in series with said first air-moving device, said additional air-moving device including a centrifugal fan having a fan shaft generally orthogonal to the common axle of said first and second air-moving devices, wherein said first, said second and said additional air-moving devices are located intermediate said thermal exchanger and said air-filter, said additional air-moving device providing additional air-moving power to move air from said air-filter towards said thermal exchanger.

7. A ventilating apparatus of claim 1, wherein said front housing portion includes an aperture through which said air filter can be inserted into or removed from said filter compartment.

8. A ventilating apparatus of claim 1, wherein said filter compartment generally extends between said front and rear housing portions.

9. A ventilating apparatus of claim 1, wherein the filtering plane of said filter is substantially orthogonal to the axes of rotation of said air-moving devices.

10. A ventilating apparatus of claim 1, wherein said first air-moving device includes a rotary fan having an axis which is generally perpendicular to said air-filter.

11. A ventilating apparatus of claim 1, wherein said air-filter includes a combination of activated carbon and HEPA filters.

12. A ventilating apparatus of claim 1, wherein said first and second air-moving devices include rotary fans driven by a common motor.

13. A ventilating apparatus of claim 1, wherein said thermal exchanger includes a plurality of stacked metal sheets configured to form a plurality of air-passageways, wherein air-passageways formed on the two sides of said sheet are alternatively connected to said intake and exhaust sections of said thermal exchanger.

* * * * *